Feb. 20, 1962  D. R. HYATT  3,021,814
LOUDNESS INDICATOR
Filed Sept. 19, 1960
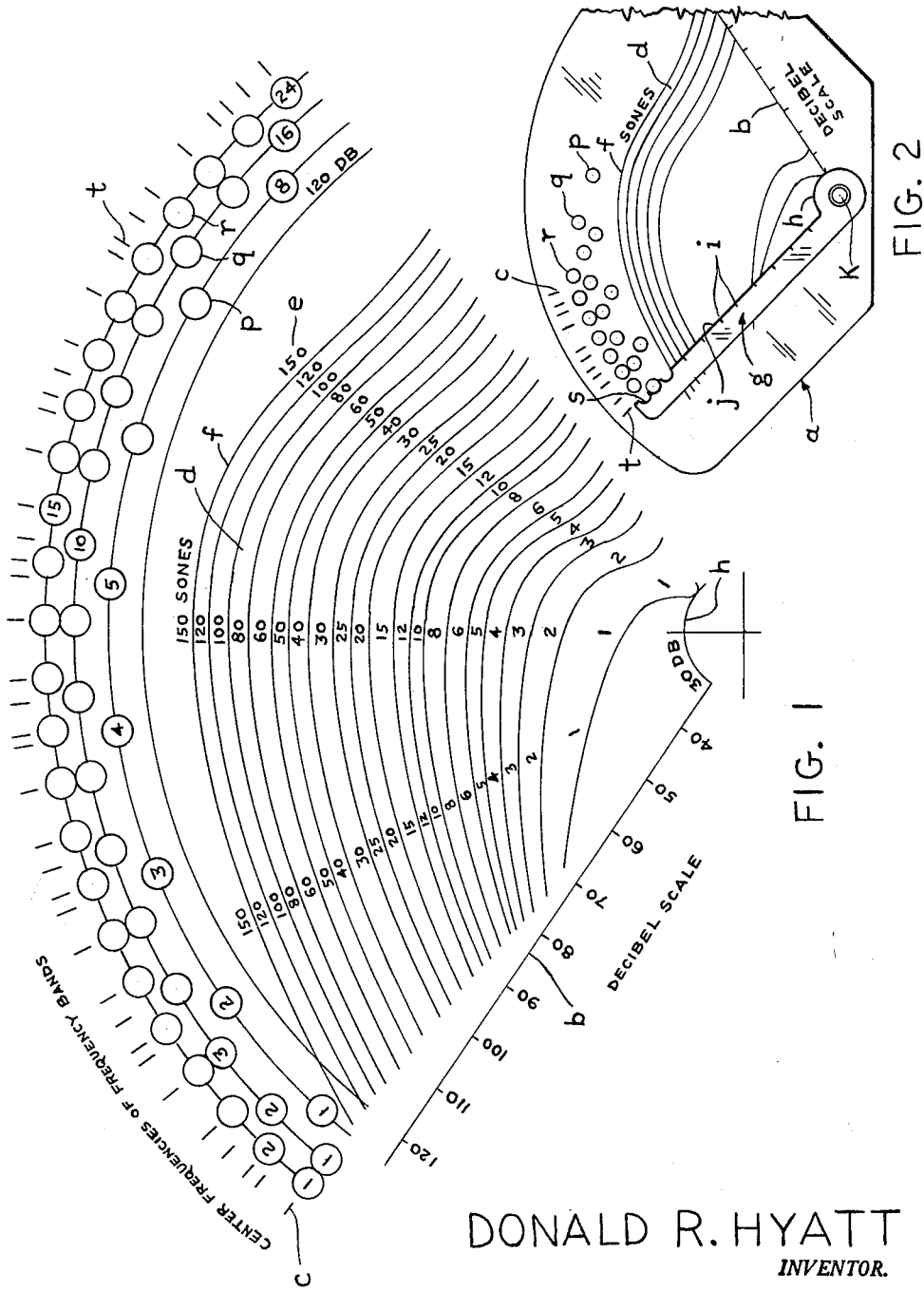
DONALD R. HYATT
INVENTOR.
BY Daniel H. Bobis
atty

United States Patent Office 3,021,814
Patented Feb. 20, 1962

3,021,814
LOUDNESS INDICATOR
Donald R. Hyatt, Old Bridge, N.J., assignor to Worthington Corporation, Harrison, N.J., a corporation of Delaware
Filed Sept. 19, 1960, Ser. No. 56,883
3 Claims. (Cl. 116—133)

This invention relates to noise studies. More particularly it is a loudness indicator to facilitate analysis of the relative severity of sounds.

This loudness indicator provides a convenient pocket-sized instrument by which degrees of loudness, weighted for frequency, may be made without recourse to drafting aides. More particularly this loudness indicator comprises a nomograph member and a movable member, with the movable member juxtaposed on the nomograph member. The nomograph member has inscribed thereon a decibel scale and a center frequency scale angularly disposed each to the other. The nomograph member further includes sone values positioned as a simultaneous function of corresponding decibel values and center frequencies. The movable member is graduated according to the decibel scale and is movable relative the nomograph member so that the decibel scale on the movable member at all times overlies corresponding decibel values on the nomograph member. On positioning the movable member to correspond with the center frequency of any desired frequency band a particular sone value on said nomograph disposed under a particular decibel value on the movable member corresponds with that particular decibel value for that frequency band.

The radially outward disposition of the decibel scale and sone curves permits a relatively larger scale as higher values are encountered. By this arrangement greater accuracy is attained without any sacrifice in size. Center frequency targets on the nomograph and associated aiming means on the movable members further increase the accuracy of sone determinations. These and other advantages will be seen more fully from the specification and claims viewed in conjunction with the accompanying drawing, in which:

FIGURE 1 is a graphical plot of empirically obtained sone values as a function of sound pressure levels in decibels and as a function of center frequencies for frequency bands of a continuous audio spectrum with associated center frequency radial targets.

FIGURE 2 depicts the loudness indicator with the plot of FIGURE 1 on a reduced scale disposed on a nomograph member and with a dial having the decibel scale inscribed thereon.

As shown in the drawing the loudness indicator comprises a nomograph member $a$ with decibel values represented thereon as a scalar quantity shown according to decibel scale $b$ and with center frequency values of full, half and third octave frequency bands represented as a scalar quantity and shown according to frequency scale, $c$. In the shown embodiment the decibel value representations are a linear radial numerical scale. The center frequency value representations are shown as an angular (circular) numerical scale. It is obvious from geometry that any other graphic representation of these two parameters may be used as long as the constant frequency representations intercept the constant decibel representations at equal incidence angles. In FIGURE 1, the decibel $b$ and frequency $c$ scales set the basic polar coordinate system. These parameters were selected for the basic coordinate system because they are generally the independent parameters under consideration. As will be seen below, both of these parameters are usually determinable by convenient instruments. The polar orientation of scales provides a magnification at the periphery $d$ where higher and more significant measurements are encountered.

Sone value representations $e$ are included on the nomograph as a scalar quantity as a simultaneous function of both decibels and center frequencies. In making the nomograph member $a$, sone value representations $e$ are entered according to the decibel and frequency coordinates as a function of both parameters. A convenient technique of presenting sone values is to use iso-sone contours $f$.

Movable member $g$ juxtaposed on nomograph member $a$ is movable perpendicular to constant decibel representations such as the 30 decibel representation $h$ so as to intercept constant decibel representations at equal incidence angles. Movable member $g$ has decibel representations $i$ thereon to the same scale as decibel scale $b$ on nomograph member $a$. In FIGURE 2 movable member $g$ is seen to have a radial straight edge $j$ with the decibel representations $i$ enscribed thereon. The significant feature of the movable disposition of movable member $g$ is that decibel representation $i$ on movable member $g$ at all times overlie corresponding decibel value representations according to decibel scale $b$ on nomograph member $a$. If, for example, the decibel and center frequency coordinates on nomograph member $a$ were rectilinear or diamond shaped then movable member $g$ would have to traverse a straight line rather than the arcuate path shown in FIGURE 2.

Movable member $g$ is shown as a dial rotatable about pin $k$ for angular positioning relative to any desired center frequency as determined on center frequency scale $c$. By positioning movable member $g$ along any particular constant center frequency representation, a radius, the particular sone value representation on nomograph member $a$ under any particular decibel value representation according to decibel representations $i$ on movable member $g$ corresponds with that particular decibel value for the frequency band with that center frequency.

Center frequency target means shown as circles on nomograph member $a$ mark the center frequencies of convenient bands. The frequency bands usually considered include full octave bands whose center frequency targets $p$ are inside half octave center frequency targets $q$ and third octave center frequency targets $r$.

Aiming means comprise geometrically regular slots $s$ in dial $g$ which facilitate the aiming of radial straight edge $j$ on center frequency targets. Fine marks $t$ permit further refinement of aiming dial $g$.

This device is rooted in research on calculating the loudness of industrial sounds carried out at the Psycho-Acoustic Laboratory, Harvard University. Pertinent results of the Harvard research are reported by S. S. Stevens in volume 28, No. 5, The Journal of the Acoustical Society of America, dated September 1956 at pages 807 through 832. A subsequent report by S. S. Stevens appears in volume 3, No. 5, September 1957 issue of Noise Control, a publication of the Acoustical Society of America, published by the American Institute of Physics for the Acoustical Society of America at Prince and Leomon Streets, Lancaster, Pennsylvania.

The decibel function is logarithmic and as such leads to confusion for those not familiar with logarithmic progressions. Loudness expressed as a decibel value has limited significance to laymen. For this reason the sone unit was set up referenced to the loudness of a 1000 cycle tone with a sound pressure level of 40 decibels. On this basis 2 sones would be equal to the loudness of a 1000 cycle tone with a sound pressure level of 50 decibels. For each doubling of the sone values the decibel value goes up by 10. Similarly for each halving of the sone value the decibel value goes down by 10.

For greatest convenience and understanding reference to sounds as "twice as loud," "half as loud," "three times as loud," etc. is better served by sone values that progress in a semilog relationship.

As is well known in acoustics, loudness level and loudness are quite different concepts. A pure tone of 1000-c.p.s. is accepted as a standard. By the loudness level of a given sound is meant the sound pressure level of an equally loud 1000-c.p.s. tone. For example, if the noise of a machine sounds as loud to the typical listener as a 1000-c.p.s. one at 80 decibels sound pressure level, we say that the loudness level of the noise is 80 units (called phons). Loudness level in phons is thus an arbitrary yardstick which is nonlinearly related to loudness.

It was desired to know how loudness itself (to the listener) depends on loudness level (sound pressure level in decibels). By this is meant: What do people say when they try to describe loudness in quantitative terms? This relationship was developed experimentally. It was shown that loudness as estimated by the median listener, approximates a power function of the intensity of a 1000-c.p.s. tone. Loudness was found to be proportioned to the 0.3 power of the intensity (energy flux density). Or, by defining a unit of loudness to be the sone, as loudness heard by the median listener confronted with a 1000-c.p.s. tone at a second pressure level of 40 decibels (40 phons), the relationship of sones, $S$, to phons, $P$, was ascertained as $$\log_{10} S = 0.03P - 1.2$$

Major studies have also been made to determine at what level different frequencies sound as loud as a 1000-c.p.s. tone at a given level. In building a scheme for the calculation of loudness of complex sounds, bands of noise rather than pure tones are involved. Consequently there evolved equal loudness contours for frequency bands which appear as iso-sone contours $f$ on nomograph member $a$. As is well known in the acoustic art, relatively inexpensive field instruments (sound level meters and octave band filters) are available to measure sound pressure level (decibels) for various frequency bands. The present loudness indicator can then be used to directly read corresponding sone values for the sound pressure levels (decibels). By aligning dial $g$ to correspond with the center frequency of the appropriate frequency band, the appropriate sone readings appear on the nomograph member $a$ below the decibel representation $i$ of dial $g$.

It is generally also necessary to know how loudness of separate bands combine to produce a total impression of loudness. Considerations including mutual inhibition have led to a formula relating total loudness of a noise in sones, $S_t$, to the loudness in sones of the individual bands that comprise the noise. This formula is $$S_t = S_m + F(\Sigma S - S_m)$$

which says that the overall loudness, $S_t$, in sones is the loudness of the loudest band, $S_m$, plus some coefficient, $F$, multiplied by the sum of the loudness of all of the remaining bands. Knowing $S_m$ and $\Sigma S$ there remain two unknowns $S_t$ and $F$ so at least one more equation is necessary and a third equation would generally be a desirable check on the arithmetic. The fact that the overall loudness of the noise should not vary beyond acceptable limits regardless of the band width selected for analysis permits the solution of the equation. $S_m$ and $\Sigma S$ for more than one analyzer band width are calculated, and the equation is applied to both sets of analyzer results. The equations are solved simultaneously for $S_t$ and $F$. To accommodate this frequently recurring situation center frequency targets $p$, $q$, $r$ are provided in frequency scale $c$ for full $p$ half $q$ and third $r$ octave band center frequencies. While loudness calculations are especially suited to this loudness indicator, it is obvious that resourceful technicians may apply this tool to various calculation tasks.

It will be understood by those familiar with sound calculations that changes may be made in the details of construction and in the correlation of the various elements of this invention without departing from the scope of the invention as defined by the claims.

What is claimed is:

1. A device for indicating loudness comprising, a base member, a dial member pivotally connected to said base member to allow relative movement therebetween, said base member having a frequency band scale and sone nomographs thereon with the frequency band scale, in spaced relationship with the sone nomograph, said dial member having a decibel scale thereon, said dial member adapted to be positioned relative said base member along the frequency band scale thereof to indicate a point on the sone nomographs for a corresponding point on the decibel scale of said dial member.

2. The combination claimed in claim 1 wherein said dial member having slot means thereon to permit more accurate positioning thereof along the frequency band scale of said base member.

3. The combination claimed in claim 2 wherein said base member having a decibel scale thereon to correspond to the decibel scale of said dial member whereby the accuracy of said decibel scale of said dial member is insured as any misalignment therebetween would be indicated.

References Cited in the file of this patent
UNITED STATES PATENTS

| | | |
|---|---|---|
| 2,083,233 | Landerberger | June 8, 1937 |
| 2,435,606 | Sadowsky | Feb. 10, 1948 |

FOREIGN PATENTS

| | | |
|---|---|---|
| 506,039 | Great Britain | May 18, 1939 |

OTHER REFERENCES

"Electronics" publication, September 1944, page 146.